US006954773B2

United States Patent
Liu

(10) Patent No.: US 6,954,773 B2
(45) Date of Patent: Oct. 11, 2005

(54) PROVIDING AN ADDER WITH A CONVERSION CIRCUIT IN A SLACK PROPAGATION PATH

(75) Inventor: Jianwei Liu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 703 days.

(21) Appl. No.: 09/966,022

(22) Filed: Sep. 28, 2001

(65) Prior Publication Data

US 2003/0074385 A1 Apr. 17, 2003

(51) Int. Cl.⁷ .................................................. G06F 7/50
(52) U.S. Cl. ...................................................... 708/710
(58) Field of Search ................... 708/710–712

(56) References Cited

U.S. PATENT DOCUMENTS

| 4,866,658 A | * | 9/1989 | Mazin et al. | 708/702 |
| 5,493,524 A | * | 2/1996 | Guttag et al. | 708/709 |
| 5,951,630 A | | 9/1999 | Liu | 708/700 |
| 6,055,557 A | * | 4/2000 | Beck et al. | 708/700 |
| 2003/0061253 A1 | * | 3/2003 | Evans | 708/700 |

* cited by examiner

Primary Examiner—D. H. Malzahn
(74) Attorney, Agent, or Firm—Trop, Pruner & Hu, P.C.

(57) ABSTRACT

In one embodiment of the present invention, a high-speed adder is provided. This adder may incorporate a conversion circuit in a slack propagation timing path to provide for improved performance. The present invention may be incorporated into single or multi-bit adders.

29 Claims, 16 Drawing Sheets

PROVIDING AN ADDER WITH A CONVERSION CIRCUIT IN A SLACK PROPAGATION PATH

BACKGROUND

This invention relates to the field of data processing. More particularly, this invention relates to digital adder circuits used within data processing systems.

Addition is one of the most important arithmetic operations to optimize as it is frequently performed within data processing systems. A problem with producing high speed adder circuits is that the high order bits of the result are logically and physically dependent upon the carry out values from the low order bits. In other words, the carry out from the top bit of the adder is a function of every input bit. Consequently, addition operations tend to be relatively slow.

Considerable effort has been expended for decades to address the problem in order to design and develop adder circuits that are capable of operating at high speed. To that end, various addition algorithms have been developed that include adders using maximally parallel-prefix circuits. While such maximally parallel-prefix adders are a great improvement over prior designs, given the extreme focus on improving processor cycle times, there is a continuing need to reduce the time required to produce a result from an add operation.

DETAILED DESCRIPTION

The general concept of carry arbitration will be described to aid in the understanding of the invention. In the general case, the carry $c_{i+1}$ is evaluated by adding two 1-bit binary numbers $a_i$ and $b_i$. There are two general cases defined by the values of $a_i$ and $b_i$. The first case, where there is an output carry request, arises when both operand bits are equal. A 1-carry request occurs if both inputs are 1, whereas a 0-carry request if both inputs are 0. The second case, where there is no output carry request, arises when the operand bits have different values. See Table 1 in which the letter u indicates there is no output carry request.

TABLE 1

| $a_i b_i$ | $c_{i+1}$ |
|---|---|
| 0 0 | 0 |
| 1 1 | 1 |
| 0 1 | u |
| 1 0 | u |

One input pair $(a_i, b_i)$ may or may not make a carry request. If two input pairs $(a_i, b_i)$ and $(a_j, b_j)$ are used, two carry requests may occur at the same time. Therefore, it is necessary to arbitrate these two carry requests. It is of note that i and j relate to two adjacent bits (at the first level) or blocks of bits (at subsequent levels) in the calculation, thus if we are arbitrating between carry requests relating to previously arbitrated blocks of 3 bits, then i=j+3.

Figure 1:
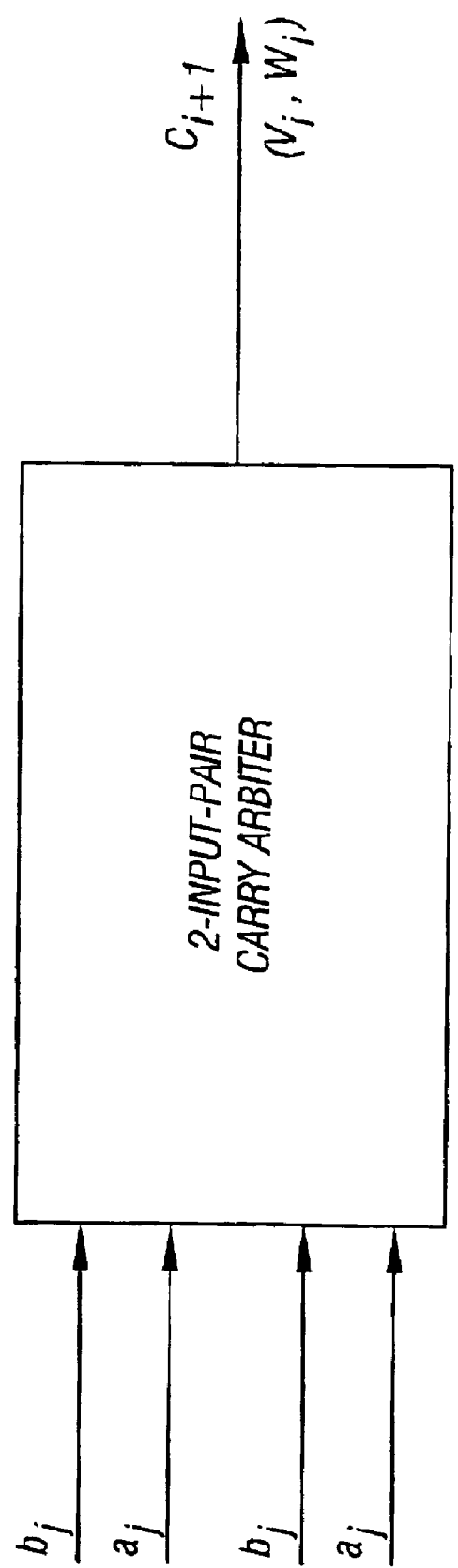
FIG. 1 illustrates a two-input-pair carry evaluation circuit.

FIG. 1 shows a 2-input-pair carry arbiter (carry evaluation circuit). The input pair $(a_i, b_i)$ can make a non-maskable carry request (non-maskable has the meaning that this request must always be acknowledged by the output carry $c_{i+1}$. The input pair $(a_j, b_j)$ can make a maskable carry request (maskable has the meaning that this request may be masked by a non-maskable carry request). Only when there is no non-maskable carry request from the input pair $(a_i, b_i)$, is a maskable carry request from the input pair $(a_j, b_j)$ acknowledged by the output carry $c_{i+1}$. This is illustrated in Table 2 below.

TABLE 2

| $a_i b_i$ | $a_j, b_j$ | $C_{i+1}$ |
|---|---|---|
| 0 0 | — — | 0 |
| 1 1 | — — | 1 |
| 0 1 (or 1 0) | 0 0 | 0 |
| 0 1 (or 1 0) | 1 1 | 1 |
| 0 1 (or 1 0) | 0 1 (or 1 0) | u |

The output carry $c_{i+1}$ 1 can be encoded using two wires $(v_i, w_i)$ as illustrated in Table 3 below.

TABLE 3

| $C_{i+1}$ | $V_i, W_i$ |
|---|---|
| 0 | 0 0 |
| 1 | 1 1 |
| u | 0 1 |
| u | 1 0 |

The signals on the two wires constitute the carry production control signal. The following equations satisfy the conditions illustrated in Tables 2 and 3:

$$V_i = a_i b_i + (a_i + b_i) a_j \quad (1)$$

$$W_i = a_i b_i + (a_i + b_i) b_j$$

Figure 2:
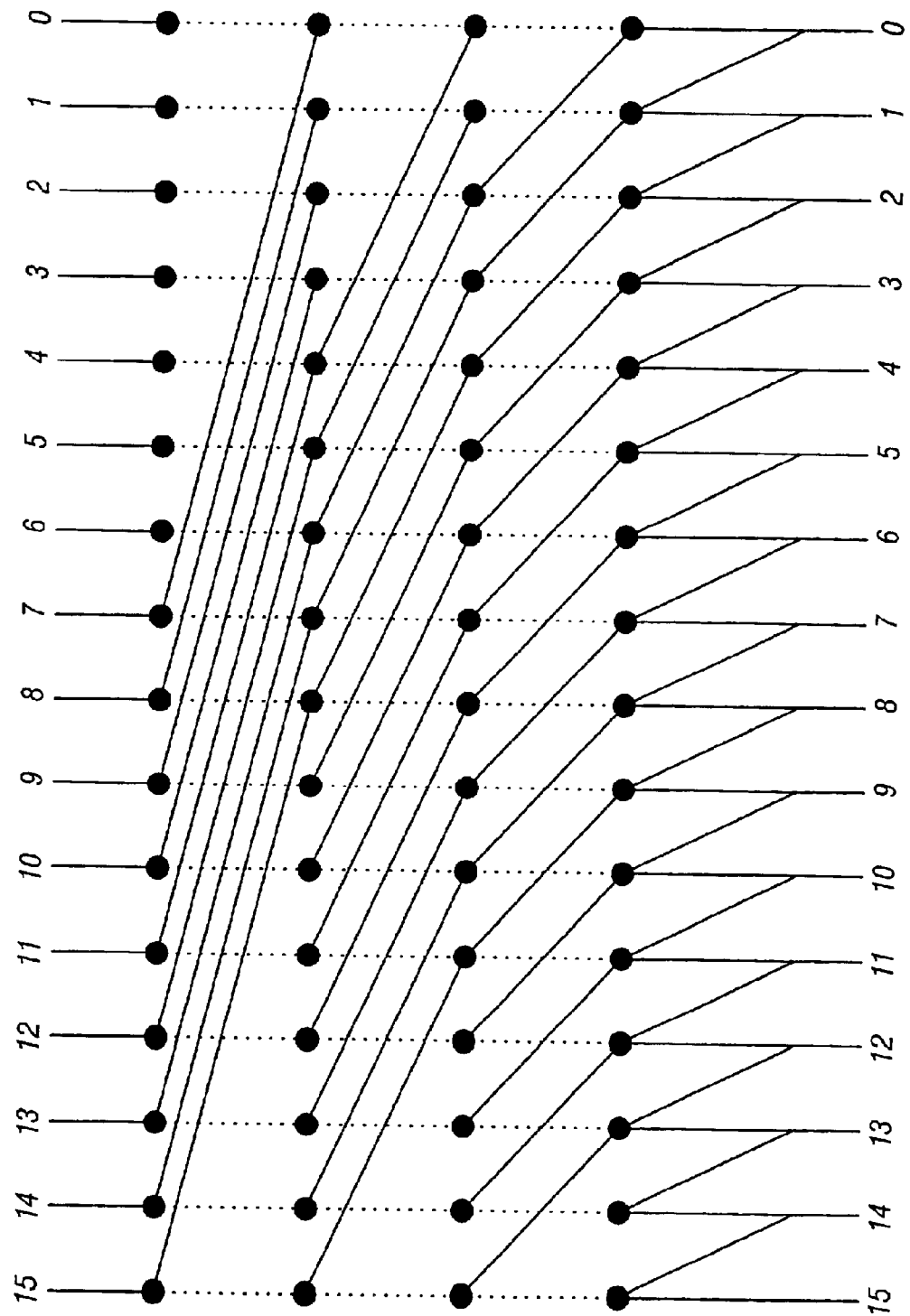
FIG. 2 illustrates a 16-bit carry binary number evaluating system incorporating the carry evaluation circuits of FIG. 1.

A 16-bit fast carry computation using 2-input-pair carry arbiters is shown in FIG. 2, which illustrates that the scheme is regular. Each node in FIG. 2 is a 2-input-bit carry arbiter. Depending on its inputs, each node can be considered to "vote" on the result to be passed up to the next level in the circuit. The node can indicate a carry generate (1, 1) (a vote yes), a carry kill (0, 0) (a vote no) or a carry propagate (0, 1) or (1, 0) (an abstention). At the bottom level, this arbitration is carried out between bits of the input operands, and at higher level between the results of previously determined arbitrations.

Figure 3:
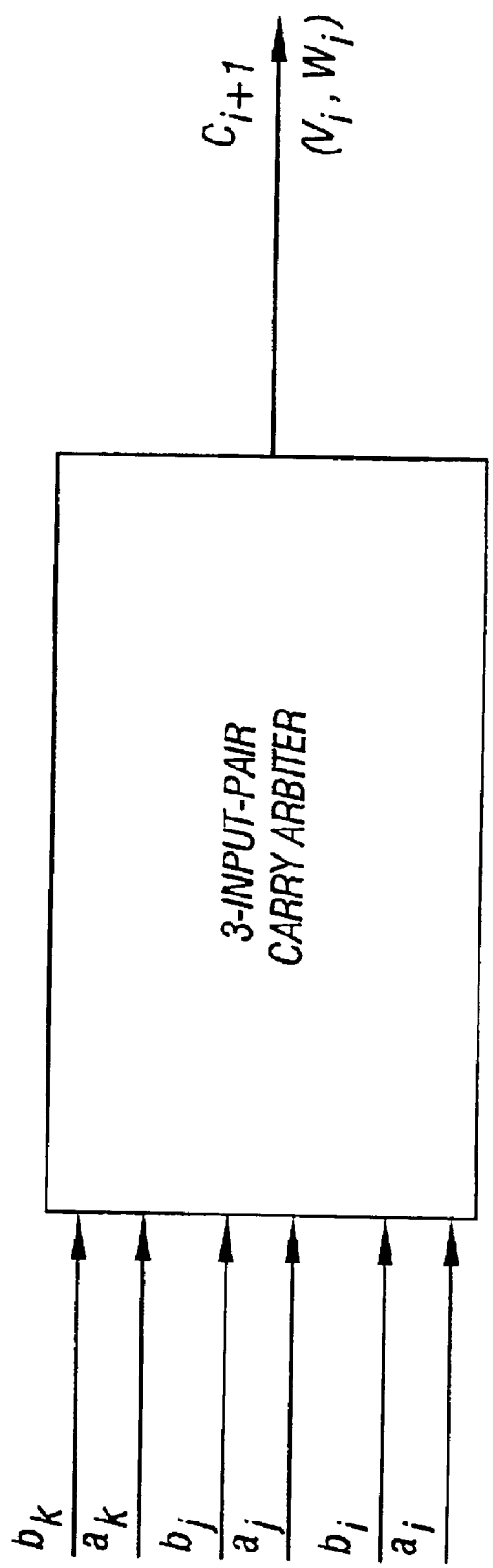
FIG. 3 illustrates a three-input-pair carry evaluation circuit.

A 3-input-pair carry arbiter is shown in FIG. 3. The input pair $(a_i, b_i)$, can make a non-maskable carry request. The input pairs $(a_j, b_j)$ and $(a_k, b_k)$ can both make a maskable carry request at the same time. However, the input pair $(a_j, b_j)$ has priority over the input pair $(a_k, b_k)$. Only when there is not a non-maskable carry request from the input pair $(a_i, b_i)$ and no maskable carry from the input pair $(a_j, b_j)$, is a maskable carry request from the input pair $(a_k, b_k)$ acknowledged by the output carry $c_{i+1}$ as illustrated in Table 4 below.

TABLE 4

| $a_i, b_i$ | $a_j, b_j$ | $a_k, b_k$ | $c_{i+1}$ |
|---|---|---|---|
| 0 0 | — — | — — | 0 |
| 1 1 | — — | — — | 1 |
| 0 1 (or 1 0) | 0 0 | — — | 0 |
| 0 1 (or 1 0) | 1 1 | — — | 1 |
| 0 1 (or 1 0) | 0 1 (or 1 0) | 0 0 | 0 |
| 0 1 (or 1 0) | 0 1 (or 1 0) | 1 1 | 1 |
| 0 1 (or 1 0) | 0 1 (or 1 0) | 0 1 (or 1 0) | u |

The following equations satisfy Tables 3 and 4:

$$V_i = a_i b_i + (a_i + b_i)(a_j b_j + (a_j + b_j) a_k) \quad (3)$$

$$W_i = a_i b_i + (a_j + b_j)(a_j b_j + (a_j + b_j) b_k)$$

Figure 4:
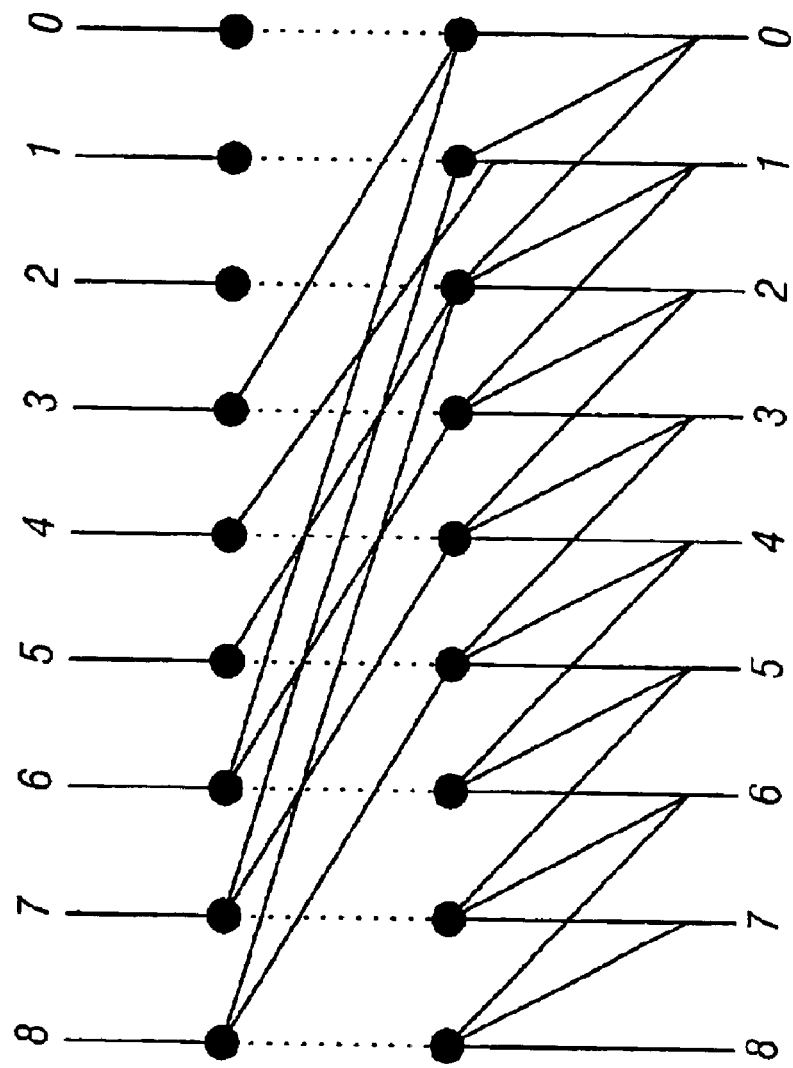
FIG. 4 illustrates a 9-bit carry binary number evaluation system incorporating the carry evaluation circuits of FIG. 3.

FIG. 4 shows a 9-bit carry computation using 3-input-pair carry arbiters, which results in only two layers of logic and hence high-speed carry generation. The addition of n-bit binary numbers using 3-input-pair carry arbiters can be performed in time proportional to $O(\log_3 n)$, and therefore is more efficient than using 2-input-pair carry arbiters where the computation time is $O(\log_2 n)$.

Using a similar approach to 2- or 3-input-pair carry arbiters, carry arbiters with any numbers of input pairs can be derived. However, carry arbiters with more than 4 input pairs are not usually of interest. Firstly, too many series transistors are needed to implement these arbiters, which leads to inefficient CMOS designs. Secondly, the arbiter cell layout may become too large for the bit slice of a datapath.

Figure 5:
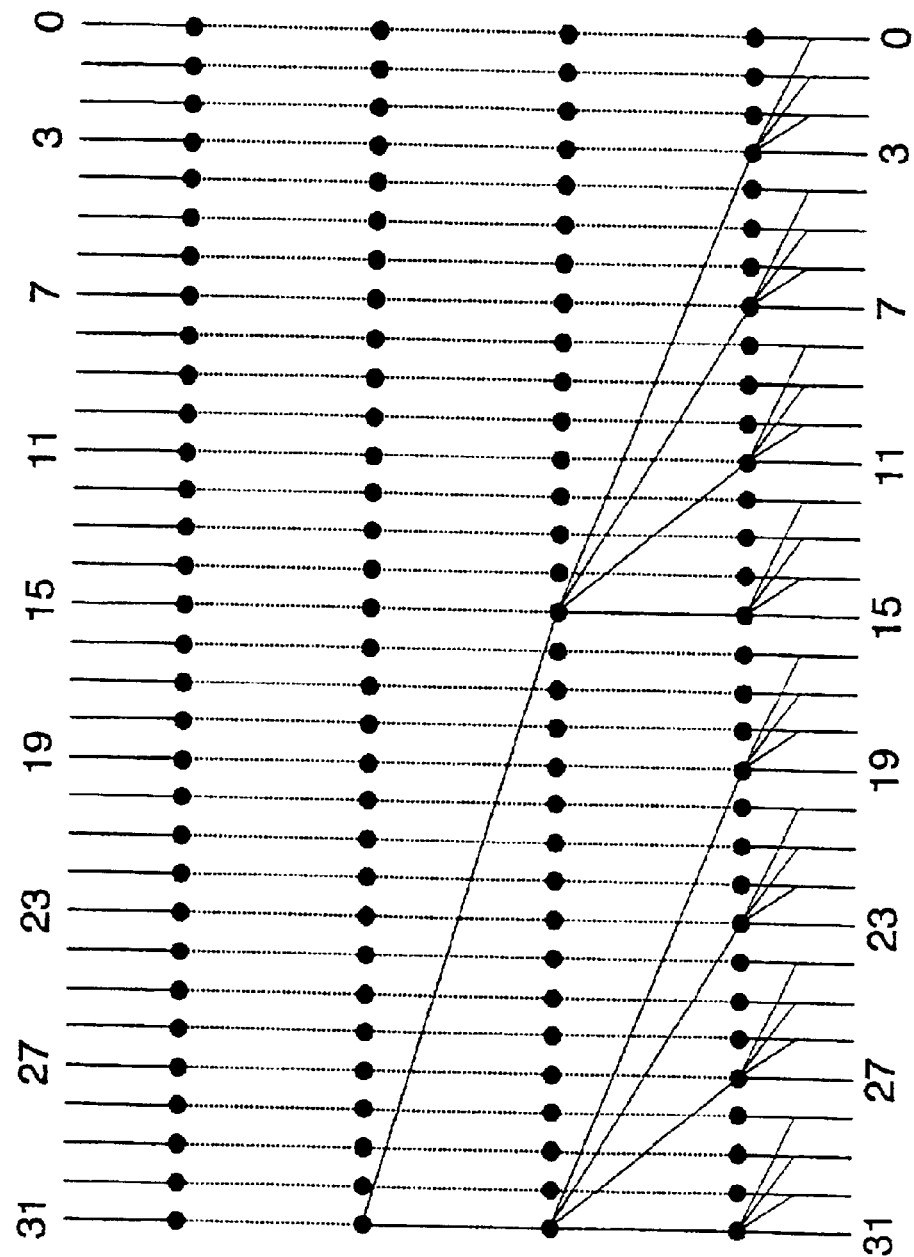
FIG. 5 illustrates the interconnections between four-input-pair carry evaluation circuits being used to calculate the most significant bit of a 32-bit carry binary number.

FIG. 5 shows a part of a 32-bit adder design that generates the carry for the 32nd bit. 4-input-pair carry arbiters are used in the first and second rows (from the bottom), whereas 2-input-pair arbiters are employed in the third row. The carry computation goes through only three logic layers.

Figure 6:
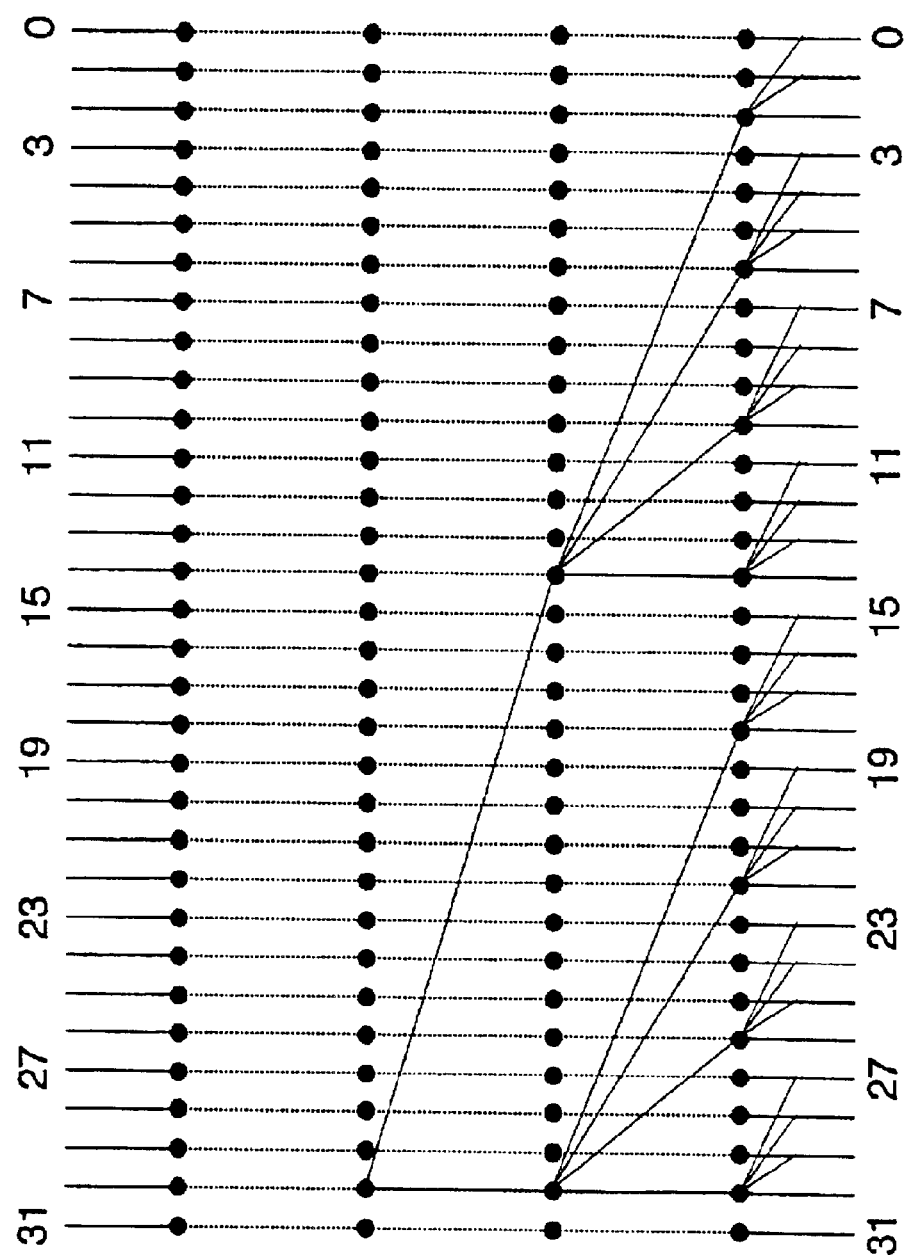
FIG. 6 corresponds to FIG. 5 except that the second most significant bit is being evaluated.
Figure 7:
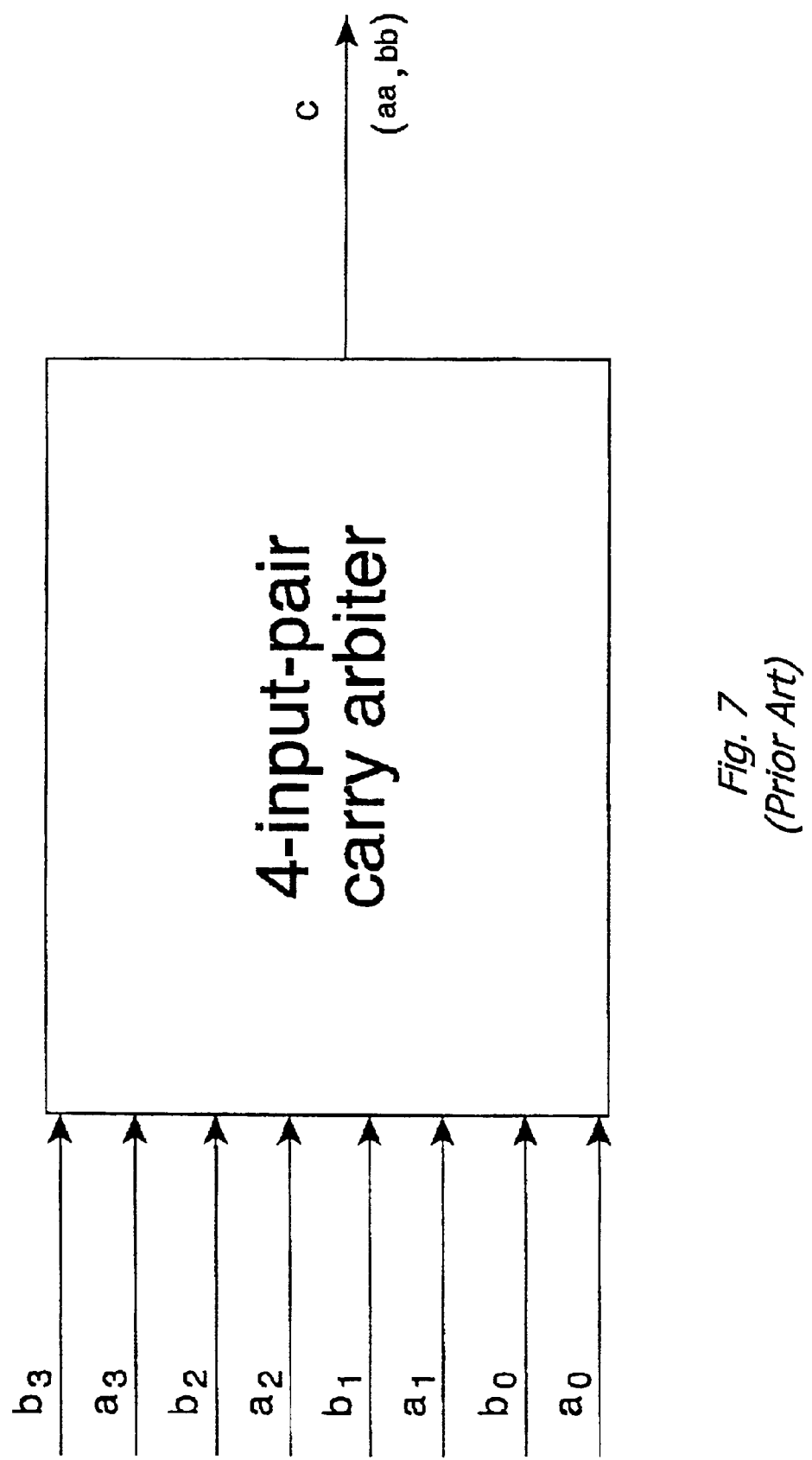
FIG. 7 illustrates a 4-input pair carry evaluation circuit.
Figure 8:
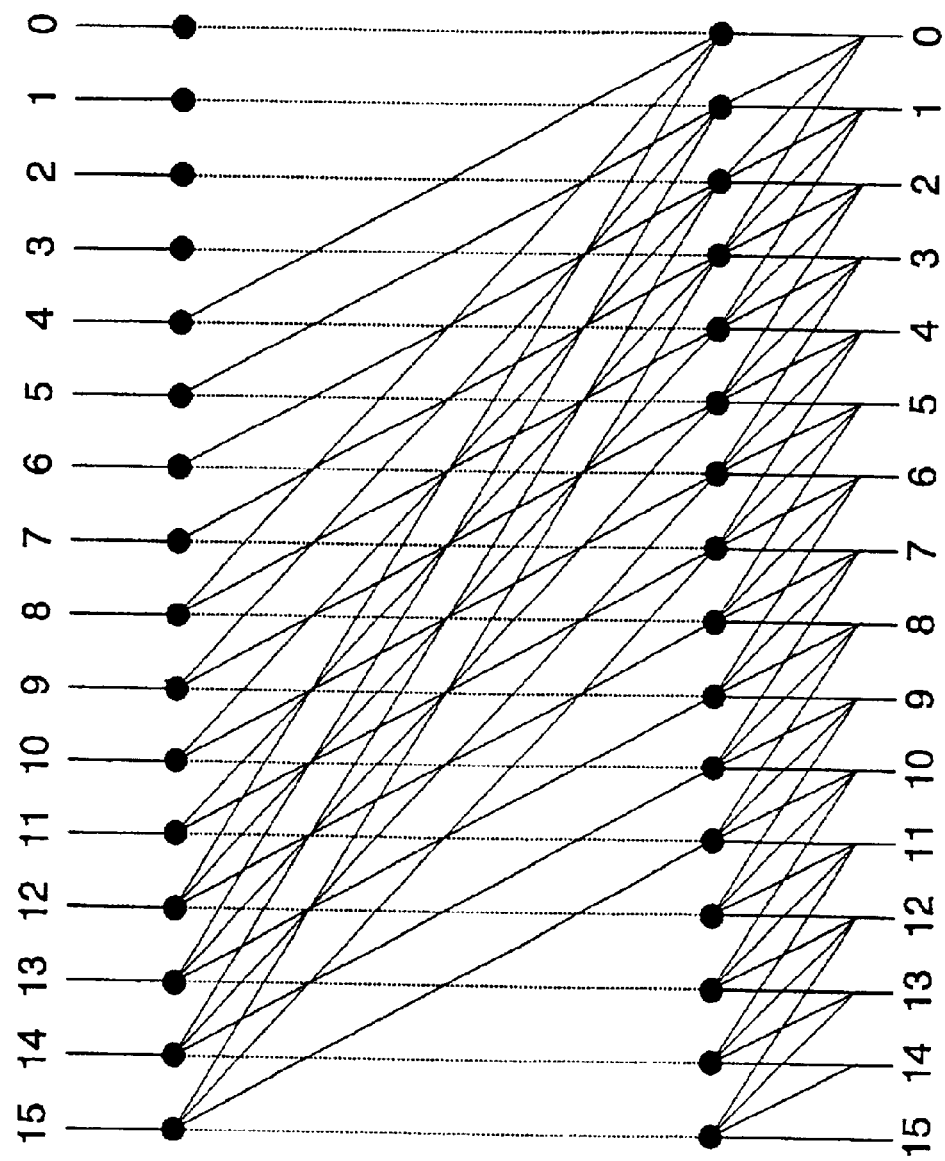
FIG. 8 illustrates a 16-bit adder using 4-input pair carry evaluation circuits.

FIG. 6 shows the part of the circuit that generates the 31st bit carry. Analogous circuit (interconnections) to those shown in FIGS. 7 and 8 are used for the other bits of the carry result. Once a carry bit has been determined (i.e. the carry-in and structure results in a generate or a kill, with propagate not being possible at that point), then a single signal wire may be used to pass that result to higher levels.

The final row is a sum circuit that operates to XOR the input operands and the carry result.

The carry out from the adder of FIGS. 5 and 6 may be achieved by expanding the three rows of carry arbiters to include a bit 32 and then putting a two bit arbiter in position 32 in the fourth row with inputs from positions 0 and 32 of the previous row. Alternatively, the circuit at position 31 in the fourth row (of adder circuits) may be changed into a full adder generating both sum and carry outputs rather than just the sum output of the XOR circuits.

As soon as $v_i$ and $w_i$ are equal (meaning that the carry has been generated), only single-rail signals need to be routed instead of dual-rail signals. This results in a significant reduction of chip area, especially in the third row where more room is needed to accommodate signals crossing from the least significant bits to the most significant bits. Thus, the resulting adder is quite compact.

As an example of the use of the above technique, the design of an 80-bit high-speed adder with a moderate chip area will now be considered.

The carry $c_i$ is evaluated by adding two 1-bit numbers $a_i$ and $b_i$ as shown in Table 1. There are two general cases defined by the values $a_i$ and $b_i$. The first case, where there is a carry request, arises when both operand bits are equal. A 1-carry request occurs if both inputs are 1, whereas a 0-carry request if both inputs are 0. The second case, where there is no carry request, arises when the operand bits have different values. The letter u indicates there is no carry request.

We introduce the concept of carry arbitration by taking a four-way carry arbiter as shown in FIG. 7 as an example. Any input pair $a_i$ and $b_i$ ($0 <= 0 <= 3$) can make a carry request and hence two or more carry requests may occur at the same time. Therefore, it is necessary to arbitrate these carry requests. The input pair $(a_3, b_3)$ can make a non-maskable carry request, where non-maskable means that a carry request from the input pair $(a_3, b_3)$ must always be acknowledged by the output "c". The other three input pairs $(a_2, b_2)$, $(a_1, b_1)$ and $(a_0, b_0)$ can make maskable carry requests, where maskable means that carry requests from these three input pairs may be masked by the input pair $(a_3, b_3)$. The input pair $(a_2, b_2)$ has higher priority than the input pairs $(a_1, b_1)$ and $(a_0, b_0)$. The input pair $(a_0, b_0)$ has the lowest priority.

Only when there is no non-maskable carry request from the input pair $(a_3, b_3)$ is a maskable carry request from the input pair $(a_2, b_2)$ acknowledged by the output c. Only when there is no non-maskable carry request from the input pair $(a_3, b_3)$ and no maskable carry request from the input pair $(a_2, b_2)$ is a maskable carry request from the input pair $(a_1, b_1)$ acknowledged by the output c. Only when there are no carry requests from the input pairs $(a_3, b_3)$, $(a_2, b_2)$ and $(a_1, b_1)$ is a carry request from the input pair $(a_0, b_0)$ acknowledged by the output c. Table 5 outlines the truth table required to implement four-way carry arbiters.

TABLE 5

| $a_3, b_3$ | $a_2, b_2$ | $a_1, b_1$ | $a_0, b_0$ | c |
|---|---|---|---|---|
| 00 | — | — | — | 0 |
| 11 | — | — | — | 1 |
| 01 or 10 | 00 | — | — | 0 |
| 01 or 10 | 11 | — | — | 1 |
| 01 or 10 | 01 or 10 | 00 | — | 0 |
| 01 or 10 | 01 or 10 | 11 | — | 1 |
| 01 or 10 | 01 or 10 | 01 or 10 | 00 | 0 |
| 01 or 10 | 01 or 10 | 01 or 10 | 11 | 1 |
| 01 or 10 | 01 or 10 | 01 or 10 | 01 or 10 | u |

Using the same approach, carry arbiters with any number of ways may be derived. The carries may be generated quickly by using carry arbiters combined into a tree structure that exploits the associativity of the carry computation.

FIG. 8, for example, illustrates 16-bit carry computation base on the carry arbitration. The solid dots represent carry arbiters. The addition of n-bit numbers using m-way carry arbiters can be performed in a time proportional to $O(\log_m n)$.

Theoretically, the more inputs each carry arbiter handles, the faster the carries are generated. However, as discussed earlier, carry arbiters with more than four ways are not usually of practical interest. Four-way carry arbiters and their dynamic CMOS implementation may be chosen because they may achieve advantageous results for a 80-bit design. Other designs, such as 32-bit adders, favor three-way carry arbiters.

Motivated by the dual-rail data encoding used in self-timed design, the carry request out c can be encoded using two wires (aa, bb) as shown in Table 6, below.

TABLE 6

| c | aa, bb |
|---|---|
| 0 | 0 0 |
| 1 | 1 1 |
| u | 0 1 |
| u | 1 0 |

Equations 6 and 7 give the behavior defined by Tables 5 and 6.

$$aa = a_3b_3 + (a_3+b_3)(a_2b_2 + (a_2+b_2)(a_1b_1 + (a_1+b_1)a_0)) \quad (6)$$

$$bb = a_3b_3 + (a_3+b_3)(a_2b_2 + (a_2+b_2)(a_1b_1 + (a_1+b_1)b_0)) \quad (7)$$

Figure 9:
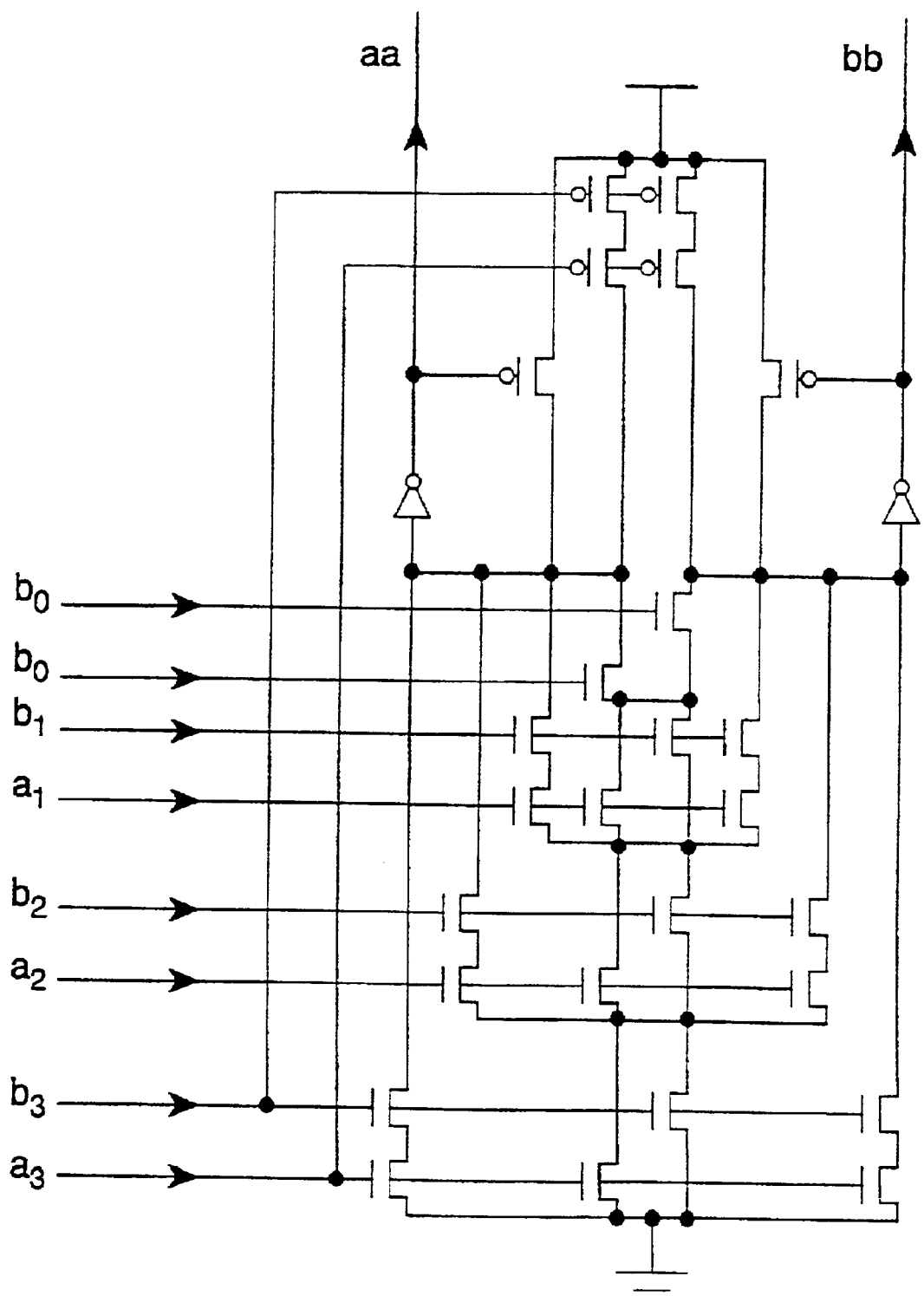
FIGS. 9 and 10 illustrate CMOS circuit implementations of 4-input pair carry evaluating circuits.

FIG. 9 shows a direct dynamic CMOS implementation of the four-way carry arbiter according to the above equations. The operation of the circuit is such that the nodes n1 and n2 are precharged high when the inputs $a_3$ and $b_3$ are low during the reset phase of the control handshake and will conditionally discharge during the evaluation phase. The buffers are used to maintain drive strength.

Figure 10:
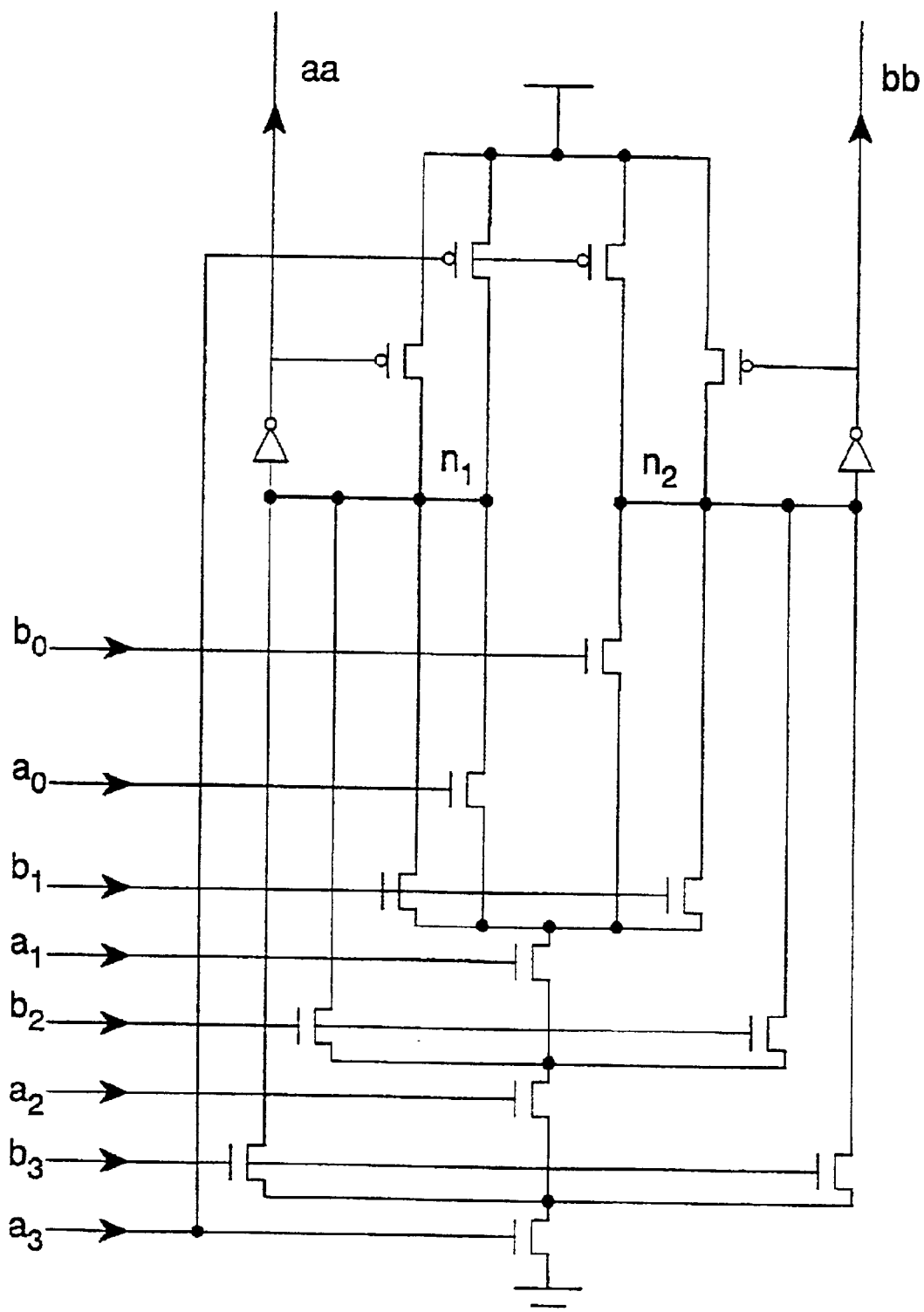

FIG. 10 gives a modified version of the four-way carry arbiter. We assume here that every input pair $(a_i, b_i)$ takes one of the three values (0 0), (1 1) and (1 0), and (0 1) has already been transformed to (1 0). The reasons are twofold. Firstly, it is easy to layout the modified circuit. Secondly and more importantly, the outputs aa and bb have new meaning. If the outputs aa and bb have different values, this means there are no carry requests from the inputs as described previously. Of course, one may design the adder to use the value of (0 1) instead of (1 0) and, in that case, convert an input pair value of (1 0) to (0 1).

However, we can take another view of a four-way carry arbiter. If we consider a four-way carry arbiter as a carry generation circuit for a 4-bit addition, then one of the outputs aa and bb can be viewed as the carry out generated with a zero carry-in and the other is with a one carry-in. The direct implementation does not distinguish which is the carry out generated with a zero carry-in and which with a one carry-in. In the modified circuit, the output aa is the carry out generated with a one carry-in and the output bb as the carry out generated with a zero carry-in. This may result in a significant reduction of chip area.

However, the use of the modified implementation needs the input conversion from (0 1) to (1 0). Fortunately this conversion is straightforward. It consists of one 2-input NAND and one 2-input NOR gate per bit. For practical reasons, gates are normally necessary anyway to isolate the signals from the main input bases. The difference here is that NAND and NOR gates are used instead of inverters. If two input buses are designed using a precharge structure, the outputs after NAND and NOR gates are naturally low (required in the dynamic implementation) when the buses are precharged high. Furthermore, these NAND and NOR gates can be reused for logic operations in an ALU design.

Figure 11:
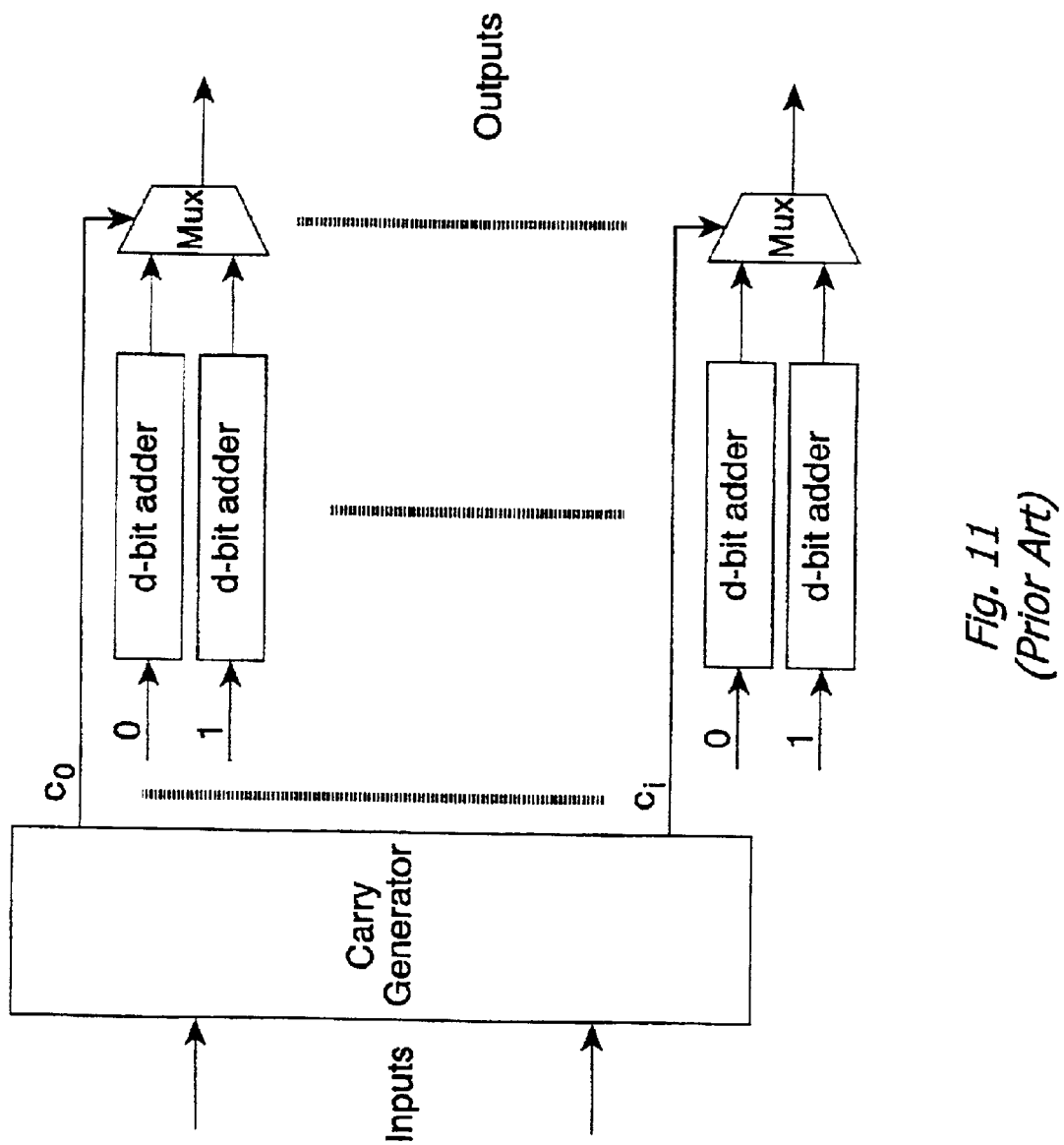
FIG. 11 illustrates a conventional adder circuit.

Consider first a conventional approach to high-speed adder design. FIG. 11 shows a conventional adder design using the carry select scheme. The inputs are divided into d-bit groups. Two adders are needed per group. One is an adder with a zero carry-in and the other with a one carry-in. The carry generator is responsible for generating the boundary carries for all groups, which are then used to select the appropriate sum using a multiplexer. A design decision must be made to choose appropriate groups in order to balance the delays of both the carry generator and the group adders. If the group adders are made too long, then the decreasing delays in the carry generator are exceeded by the increasing delays of the group adders. If the group adders are made too short, the logic depth of the carry generator increases and its delay determines the total adder delay.

Figure 12:
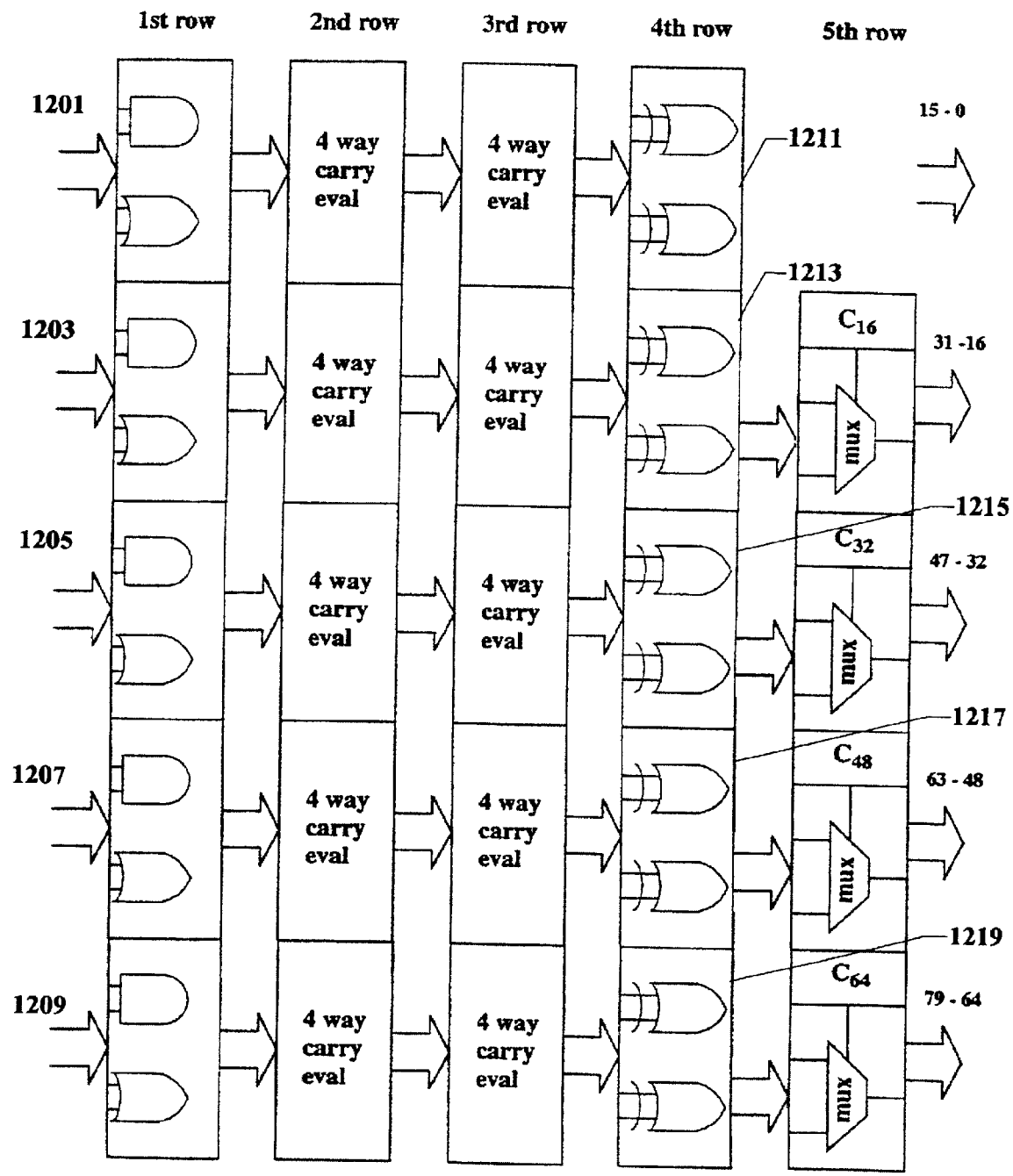
FIG. 12 illustrates an adder circuit incorporating 4-input pair carry evaluating circuits.

A block diagram of an improved 80-bit adder is shown in FIG. 12. The whole adder is visualized (but not divided) as consisting of five 16-bit groups. The first row is the conversion circuit, which contains 2-input AND and OR gates 1201–1209. The second and third rows are four-way arbiters that produce carries within each group and have the form discussed previously. The fourth row, 1211–1219, produces two intermediate sums with a zero carry-in and a one carry-in. The final row includes multiplexers which select the final sum result and three carry arbiters which generate the boundary carries $c_{16}$, $c_{32}$, $c_{48}$ and $c_{64}$. The carries of the 16 least significant bits have already been generated after two rows of the carry computation. Compared with the conventional carry-select scheme, the need for group adders has been eliminated. The two intermediate sums are elegantly generated within the carry generation tree. This may result in a significant reduction of chip area, especially when the groups are made to be long, since group adders also need some mechanisms for carry computation.

It is worth noting that only single-rail signals need to be routed (instead of dual-rail signals) if the signals aa and bb are known to be equal (meaning that the carry has been generated, as either a 1-carry or a 0-carry request).

By exploiting the properties of associatively of the logic equation governing carry generation, the adder illustrated in FIG. 12 represents a significant improvement over traditional adder designs. However, the propagation delays through the adder of FIG. 12 may still be undesirable.

Figure 13:
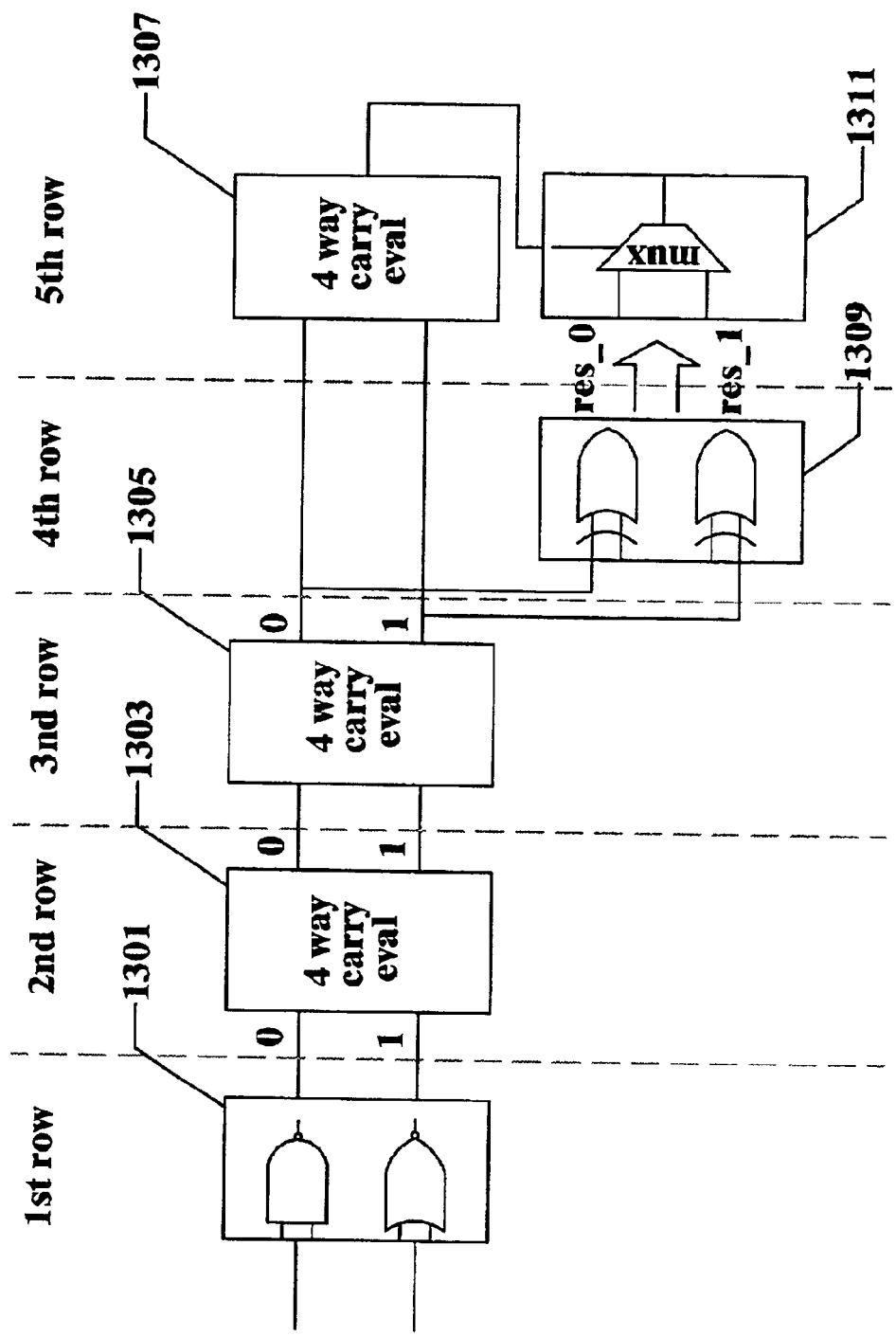
FIG. 13 illustrates a single bit version of the adder of FIG. 12.

To better understand the propagation delays through the adder of FIG. 12, reference will now be made to FIG. 13. FIG. 13 illustrates a single bit adder version of the adder in FIG. 12 where the rows in FIG. 13 correspond to like referenced rows in FIG. 12. As described before, the $1^{st}$ row includes a conversion stage 1301. The second and third rows include 4-way carry evaluators 1303 and 1305 respectively. The fourth row includes a XOR 1309 logic stage.

The $5^{th}$ row has been split into its constituent parts: a 4-way carry evaluator 1307 logic stage and a multiplexer 1311 logic stage. As before, row 4 produces two intermediate sums, res_0 and res_1, with a zero carry-in and a one carry-in respectively. The symbol "1" represents that the node is always logic "1" if two carry outputs are different. The symbol "0" represents that the node is always logic "0" if two carry outputs are different. The fifth row multiplexer 1311 selects the final sum result. The 4-way carry evaluator 1307 may be a carry-select evaluator circuit.

The total propagation delay "$T_{pt}$" through all the adder logic stages, row 1–row 5, is the total of the individual propagation delays "$T_p$" through each of the first three rows plus the longest of the propagation times associated with row 4 and row 5. The propagation time through the 4-way carry evaluator 1307 and the multiplexer 1311 may be considerably longer than the propagation time through the XOR 1309 and the multiplexer 1311. Therefore the total propagation time can be represented as:

$T_{pt}=T_p\ 1^{st}\ \text{row}+T_p\ 2^{nd}\ \text{row}+T_p\ 3^{rd}\ \text{row}+T_p\ 5^{th}\ \text{row}.$ In essence, the $4^{th}$ and $5^{th}$ rows operate in parallel. As can be seen from the above equation, the XOR logic stage 1309 is not in the critical timing path and the propagation time through this stage is considered a "slack path". The slack path time "$S_{pt}$" is simply the difference in the longest propagation path and the shortest propagation path with regards to the $4^{th}$ row and can be expressed:

$S_{pt}=((T_p\ 1307+T_p\ 1311)-(T_p\ 1309+T_p\ 1311))$

Figure 14:
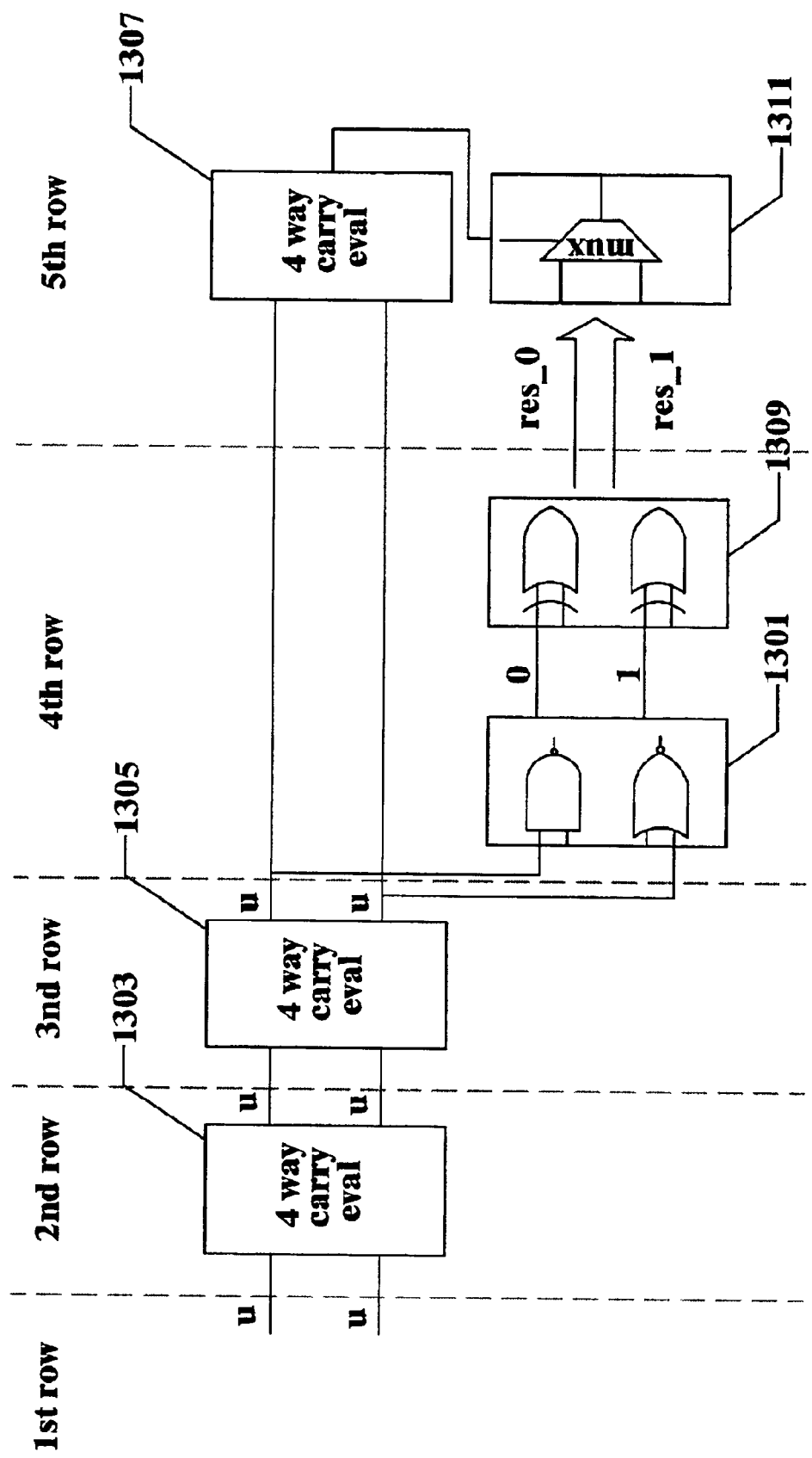
FIG. 14 illustrates an improved adder according to one embodiment of the present invention.

FIG. 14 illustrates one embodiment of the present invention where the functionality of the conversion stage 1301 has been moved from row 1 (relative to FIG. 12) to before the XOR logic stage 1309 in row 4. This change moves the propagation delay from row 1, which has now been eliminated, to the slack path in row 4. The symbol "u" represents that the node may be either logic "1" or logic "0" if two of the carry outputs are different. Knowing which carry output is "0" and which one is "1" is of no consequence for carry-generating circuits such as 1303 and 1305. However, knowing which carry output is "0" and which is "1" does matter for generating the intermediate results res_0 and res_1 by the XOR stage 1309. By placing the conversion stage 1301 before the XOR stage 1309, the same logic equation is achieved by the adder in FIG. 14 as by the adder of FIG. 13.

In FIG. 14, given that $T_p$ $1^{st}$ row is 0 (row 1 has been eliminated), for the first case where the propagation delay $T_p$ 1307+$T_p$ 1311 is equal to or greater than $T_p$ 1301+$T_p$ 1309+$T_p$ 1311, then the total propagation delay $T_{pt}$ is reduced to:

$T_{pt}=T_p\ 2^{nd}\ \text{row}+T_p\ 3^{rd}\ \text{row}++T_p\ 5^{th}\ \text{row}.$ In this case, the propagation delay through the adder may be reduced by the propagation time through row 1 ($T_p$ 1301) relative to the adder of FIG. 13.

For the second case where the propagation time through the path $T_p$ 1301+Tp1309+$T_p$ 1311 is greater than through the propagation path $T_p$ 1307+$T_p$ 1311, then the total propagation delay $T_{pt}$ for the adder in FIG. 14 is reduced by the slack path time $S_{pt}$ relative to the $T_{pt}$ for the adder of FIG. 13. In this case, $T_{pt}$ becomes:

$T_{pt}=T_p\ 2^{nd}\ \text{row}+T_p\ 3^{rd}\ \text{row}+T_p\ 4^{th}\ \text{row}\ (T_p\ 1301+T_p\ 1309)+T_p\ 5^{th}\ \text{row}\ (1311).$ So in either the first or the second case, the adder of FIG. 14 may have a reduced propagation time $T_{pt}$ relative to the adder of FIG. 13.

Figure 15:
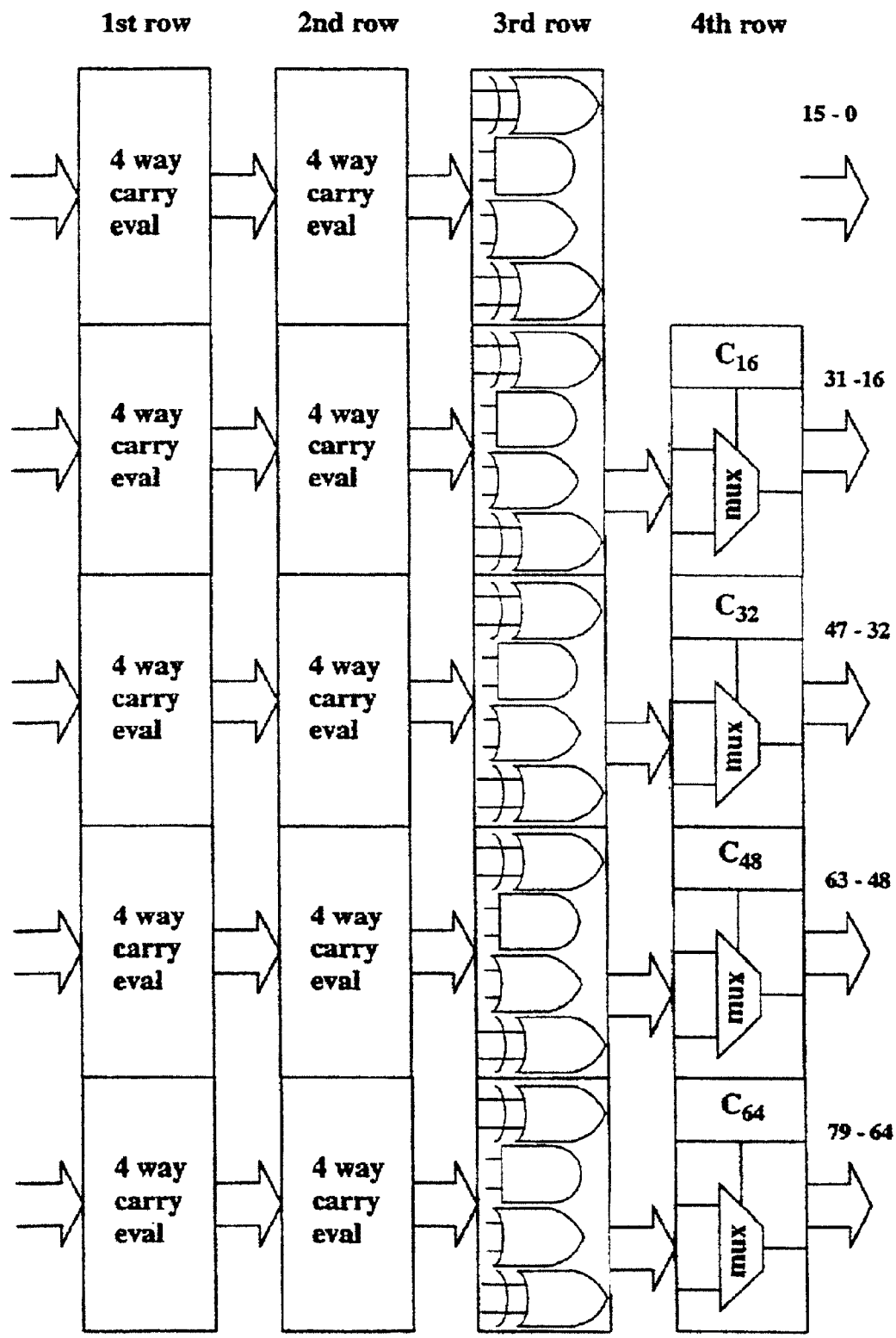
FIG. 15 illustrates an 80-bit adder according to one embodiment of the present invention.

FIG. 15 illustrates a block diagram of an 80-bit adder according to another embodiment of the invention. Again, this adder may be logically visualized (but not physically divided) into rows. Relative to the adder of FIG. 12, the first row is eliminated by merging the functionality of the 2-input AND and OR gates 1201–1209 into the $4^{th}$ row (relative to FIG. 12) with the XOR stages 1211–1219 respectively to form a combined third row. The functionality of the combined third row is as described above with respect to FIG. 14.

As described in association with FIG. 14, by moving the NAND and NOR gates 1201–1209 into the slack path of the $4^{th}$ row (with respect to the adder of FIG. 12), the total propagation time through the adder may be reduced. The critical timing path may be reduced from four rows to three rows.

Current process technologies may allow CMOS circuits operating at over 1 GHZ to accommodate about ten gates within a pipeline stage. This indicates that the adder of FIG. 15 may have an improved performance over the adder of FIG. 12 by about 10%. This improvement may be achieved without additional hardware overhead relative to the adder of FIG. 12.

Figure 16:
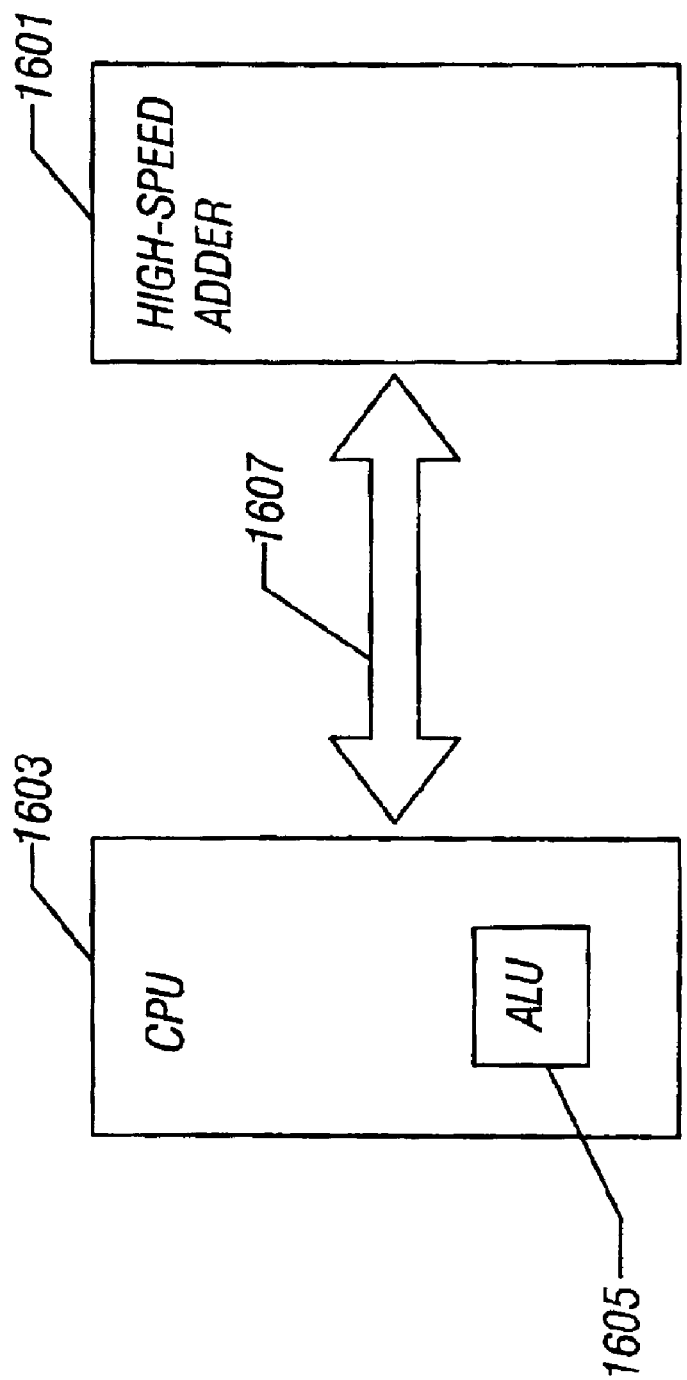
FIG. 16 illustrates an adder according to the present invention coupled to a microprocessor.

In some embodiments of the present invention as shown in FIG. 16, the high speed adder 1601 may be coupled to a microprocessor "CPU" 1603 with busses 1607. The adder may provide on-chip addition hardware for an arithmetic logic 1605 unit inside the CPU. In other embodiments, the high speed adder 1601 may be a co-processor external to the microprocessor 1603 and may be coupled to the microprocessor with busses 1607.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The present invention has been described with respect to a limited number of embodiments; those skilled in the art will appreciate numerous modifications and variations therefrom. It is intended that the appended claims cover all such modifications and variations as fall within the true spirit and scope of this present invention.

What is claimed is:

1. An adder circuit for adding a first binary number and a second binary number, the adder comprising:
   a carry evaluating circuit to generate a carry production control signal representing a sum of a block of corresponding bits of the first binary number and the second binary number, the carry production control signal comprising two signals A and B that can each have a value of either P or Q; and
   a conversion circuit coupled to receive the A and B outputs and to output two signals X and Y, each having a value of either P or Q, and X and Y having one of three possible values.

2. An adder as in claim 1 wherein X and Y have one of three possible values in accordance with:

|         | X | Y |
|---------|---|---|
| Value 1 | P | P |
| Value 2 | Q | P |
| Value 3 | Q | Q. |

3. An adder as in claim 1 wherein X and Y have one of three possible values in accordance with:

|         | X | Y |
|---------|---|---|
| Value 1 | P | P |
| Value 2 | P | Q |
| Value 3 | Q | Q. |

4. An adder as in claim 1 wherein P=0 and Q=1.

5. An adder as in claim 1 further comprising:
   a second circuit coupled to said conversion circuit to receive the X and Y outputs and outputting a first result if an input carry has a value of 1 and a second result if the input carry value has a value of 0.

6. An adder as in claim 5, wherein the carry evaluating circuit is coupled to a carry-select circuit.

7. An adder circuit as in claim 1 wherein the carry evaluating circuit is coupled to two pairs of input signals that comprise one of two respective pairs of bits of the first binary number and the second binary number and two previously evaluated carry production signals.

8. An adder circuit as in claim 1 wherein the carry evaluating circuit is coupled to three pairs of input signals that comprise one of three respective pairs of bits of the first binary number and the second binary number and three previously evaluated carry production signals.

9. An adder circuit as in claim 1 wherein the carry evaluating circuit is coupled to four pairs of input signals that comprise one of four respective pairs of bits of the first binary number and the second binary number and four previously evaluated carry production signals.

10. An adder circuit as in claim 1 wherein the carry evaluating circuit is coupled to N pairs of input signals that comprise one of N respective pairs of bits of the first binary number and the second binary number and N previously evaluated carry production signals.

11. An adder circuit as in claim 1 including a plurality of carry evaluating circuits in a parallel prefix structure to evaluate a full set of carry bits from the first binary number and the second binary number.

12. An adder as in claim 1, wherein the carry evaluating circuit is formed of a plurality of static CMOS logic gates.

13. An adder as in claim 1, wherein the carry evaluating circuit is formed of a plurality of dynamic CMOS logic gates.

14. An adder as in claim 1, further comprising:
a carry binary number determining circuit, responsive to the first binary number and the second binary number to generate a carry binary number composed of carry bits of a sum of the first binary number and the second binary number, the carry binary number determining circuit having a plurality of circuit stages to operate in series to generate the carry binary number, each circuit stage to partially resolve the carry binary number and at least one circuit stage including at least one of the carry bit evaluating circuits generating a carry control production signal that is coupled between the circuit stages as an input signal to a next circuit stage; and
a combinatorial logic circuit coupled to respective corresponding bits of the first binary number, the second binary number and the carry binary number to generate a corresponding bit of a result binary number.

15. An adder as in claim 14, wherein the combinatorial logic circuit performs a logical XOR operation.

16. An adder as in claim 1, wherein the carry evaluating circuit is coupled to a microprocessor.

17. A microprocessor comprising:
an arithmetic logic circuit including an adder having a carry evaluating circuit to generate a carry production control signal representing a sum of a block of corresponding bits of the first binary number and the second binary number, the carry production control signal comprising two signals A and B that can each have a value of either P or Q; and
a conversion circuit coupled to receive the A and B outputs and the conversion circuit outputting two signals X and Y, each having a value of either P or Q, and X and Y having one of three possible values.

18. A microprocessor as in claim 17 further comprising:
a second circuit coupled to said conversion circuit to receive the X and Y outputs and outputting a first result if the input carry has a value of 1 and a second result if the input carry has a value of 0.

19. A microprocessor circuit as in claim 17 wherein the carry evaluating circuit is coupled to two pairs of input signals that comprise one of two respective pairs of bits of the first binary number and the second binary number and two previously evaluated carry production signals.

20. A microprocessor circuit as in claim 17 wherein the carry evaluating circuit is coupled to three pairs of input signals that comprise one of three respective pairs of bits of the first binary number and the second binary number and three previously evaluated carry production signals.

21. A microprocessor circuit as in claim 17 wherein the carry evaluating circuit is coupled to N pairs of input signals that comprise one of N respective pairs of bits of the first binary number and the second binary number and N previously evaluated carry production signals.

22. A microprocessor circuit as in claim 17 including a plurality of carry evaluating circuits in a parallel prefix structure to evaluate a full set of carry bits from the first binary number and the second binary number.

23. A microprocessor as in claim 17, further comprising:
a carry binary number determining circuit, responsive to the first binary number and the second binary number to generate a carry binary number composed of carry bits of a sum of the first binary number and the second binary number, the carry binary number determining circuit having a plurality of circuit stages to operate in series to generate the carry binary number, each circuit stage to partially resolve the carry binary number and at least one circuit stage including at least one of the carry bit evaluating circuits generating a carry control production signal that is passed between the circuit stages as an input signal to a next circuit stage; and
a combinatorial logic circuit responsive to respective corresponding bits of the first binary number, the second binary number and the carry binary number to generate a corresponding bit of a result binary number.

24. A microprocessor as in claim 23, wherein the combinatorial logic circuit performs a logical XOR operation.

25. A microprocessor as in claim 23, wherein the carry evaluating circuit is coupled to a carry-select circuit.

26. A method for adding a first and a second binary number, each having a plurality of bits, comprising:
generating a carry production control signal representing a sum of a plurality of corresponding bits of the first binary number and the second binary number where the carry production control signal comprises two signals A and B that can each have a value of either P or Q; and
converting the A and B signals into two signals, X and Y, representing one of three possible values.

27. The method of claim 26 further comprising:
receiving the X and Y signals and generating a first result if an input carry value has a value of 1 and a second result if the input carry value has a value of 0.

28. The method of claim 27 further comprising:
receiving the X and Y signals and generating a final result utilizing a carry-select evaluator circuit.

29. The method of claim 27 further comprising:
determining a final binary result of adding the first and second binary numbers by utilizing a plurality of carry evaluating circuits in a parallel prefix structure to generate a full set of carry bits from the first binary number and the second binary number.

* * * * *

UNITED STATES PATENT AND TRADEMARK OFFICE
CERTIFICATE OF CORRECTION

| | | |
|---|---|---|
| PATENT NO. | : 6,954,773 B2 | Page 1 of 2 |
| APPLICATION NO. | : 09/966022 | |
| DATED | : October 11, 2005 | |
| INVENTOR(S) | : Jianwei Liu | |

It is certified that error appears in the above-identified patent and that said Letters Patent is hereby corrected as shown below:

Col. 8, line 29, "the adder" should read --the adder circuit--.
Col. 8, lines 36-37, "A and B outputs" should read --A and B signals--.
Col. 8, line 38, "X and Y" should read --the X and Y signals--.
Col. 8, line 40, "adder" should read --adder circuit-- and "X and Y" should read --the X and Y signals--.
Col. 8, line 50, "adder" should read --adder circuit-- and "X and Y" should read --the X and Y signals--.
Col. 8, line 60, "adder" should read --adder circuit--.
Col. 8, line 61, "adder" should read --adder circuit--.
Col. 8, line 63, "the X and Y outputs" should read --the X and Y signals--.
Col. 8, line 66, "adder" should read --adder circuit--.
Col. 9, line 25, "adder" should mad --adder circuit--.
Col. 9, line 27, "adder" should mad --adder circuit--.
Col. 9, line 29, "adder" should read --adder circuit--.
Col. 9, line 47, "adder" should read --adder circuit--.
Col. 9, line 49, "adder" should read --adder circuit--.
Col. 9, lines 55-56, "the first binary number" should read --a first binary number-- and "the second binary number" should read --a second binary number--.
Col. 9, lines 59-60, "the A and B outputs" should read --the A and B signals--.
Col. 9, line 62, "X and Y" should read --the X and Y signals--.
Col. 9, line 65, "the X and Y outputs" should read --the X and Y signals--.
Col. 9, line 66, "the input carry" should read --an input carry--.
Col. 10, line 1, "microprocessor circuit" should read --microprocessor--.
Col. 10, line 6, " microprocessor circuit" should read --microprocessor--.
Col. 10, line 12, " microprocessor circuit" should read --microprocessor--.
Col. 10, line 17, " microprocessor circuit" should read --microprocessor--.

UNITED STATES PATENT AND TRADEMARK OFFICE
CERTIFICATE OF CORRECTION

PATENT NO. : 6,954,773 B2
APPLICATION NO. : 09/966022
DATED : October 11, 2005
INVENTOR(S) : Jianwei Liu It is certified that error appears in the above-identified patent and that said Letters Patent is hereby corrected as shown below:

Col. 10, lines 43-44, "a first and a second binary number" should be --a first binary number and a second binary number--.

Signed and Sealed this

Eleventh Day of September, 2007

JON W. DUDAS
*Director of the United States Patent and Trademark Office*